C. H. HAPGOOD.
MASTER PULSATOR MECHANISM FOR MILKING MACHINES.
APPLICATION FILED MAR. 31, 1921.
1,424,401.
Patented Aug. 1, 1922.
2 SHEETS—SHEET 1.
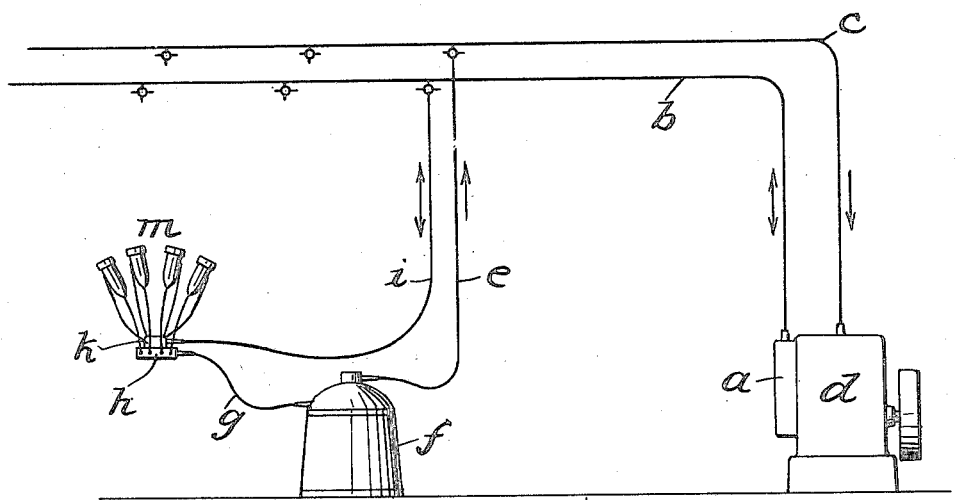
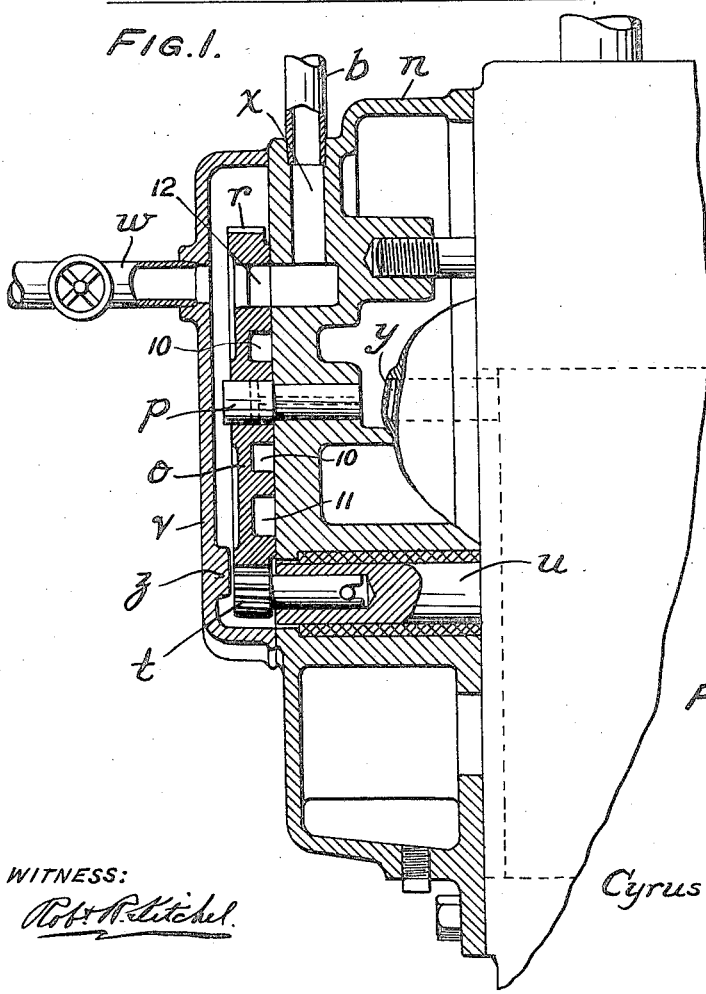

UNITED STATES PATENT OFFICE.

CYRUS HOWARD HAPGOOD, OF NUTLEY, NEW JERSEY, ASSIGNOR TO THE DE LAVAL SEPARATOR COMPANY, OF NEW YORK, N. Y., A CORPORATION OF NEW JERSEY.

MASTER-PULSATOR MECHANISM FOR MILKING MACHINES.

1,424,401. Specification of Letters Patent. Patented Aug. 1, 1922.

Application filed March 31, 1921. Serial No. 457,325.

*To all whom it may concern:*

Be it known that I, CYRUS HOWARD HAPGOOD, a citizen of the United States, residing at Nutley, county of Essex, and State of New Jersey, have invented a new and useful Improvement in Master-Pulsator Mechanism for Milking Machines, of which the following is a full, clear, and exact description, reference being had to the accompanying drawings, which form a part of this specification.

It is known in the art to provide a master pulsator adapted to connect a pulsation pipe line alternately with a source of partial vacuum and with a source of pressure. The pulsation pipe line is connected with a secondary pulsator whereby the latter is operated to connect the teat cups (usually the outer pulsation chambers of double chambered teat cups) alternately with atmosphere and with the source of vacuum.

The object of my invention is to provide a master pulsator valve of the rotary type so constructed as to adapt it to the requirements of a milking machine system and at the same time overcome the objections inherent in many valves of the rotary type.

A preferred embodiment of the invention is illustrated in the accompanying drawings, wherein—

Fig. 1 is a diagram of a milking machine system in which my invention may be incorporated.

Fig. 2 is a vertical sectional view of the head of a vacuum pump with valve seated thereon.

The system comprises any source of vacuum, as, for example, a vacuum pump $d$, shown in diagram in Fig. 1. From the vacuum chamber of the pump extends a vacuum pipe line $c$. From the master pulsator $a$, which, as hereinafter described, comprises also the head of the vacuum pump, extends a pulsation pipe line $b$.

The vacuum pipe line $c$ is connectible, by means of a detachable branch vacuum pipe $e$, with a milk pail $f$, from which extends a milk pipe $g$ to the milk chamber $h$ of a claw. The pulsation pipe line $b$ is connectible, by means of a detachable branch pulsation pipe $i$, with a secondary valve (not shown) in the valve chamber $k$ of the claw. The teat cups $m$ have their outer and inner chambers connected respectively with the valve chamber $k$ and the milk chamber $h$ of the claw.

The master pulsator valve $o$ is applied to any suitable valve seat member. In Fig. 2 it is shown as applied to the head $n$ of the vacuum pump and virtually forms part thereof. Any suitable vacuum pump may be employed. For example, the head $n$ may constitute part of a vacuum pump the main body of which is constructed as shown and described in detail in the Leitch application, Serial No. 361,609, filed February 25, 1920. In the present construction, the head of the Leitch pump has been modified to adapt it to the master pulsator valve $o$. The valve $o$ is shown as mounted on a pivot pin $p$ secured in the head $n$.

The periphery of the valve is provided with gear teeth $r$ engaged by a driving pinion $t$ secured to the end of the pump shaft $u$. A cover $v$ encloses valve $o$ and pinion $t$. The cover is open to atmosphere. As shown, a valved pipe $w$ is connected with the enclosed space and this valve may, if desired, be connected with any suitable source of pressure other than the atmosphere.

Figure 3:
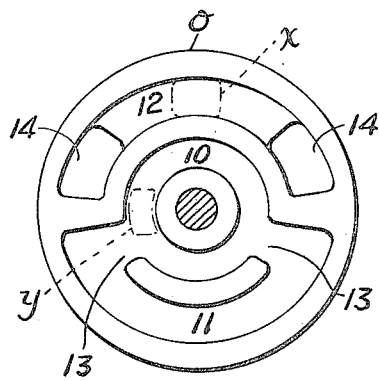
Fig. 3 is an inner face view of the valve
Figure 4:
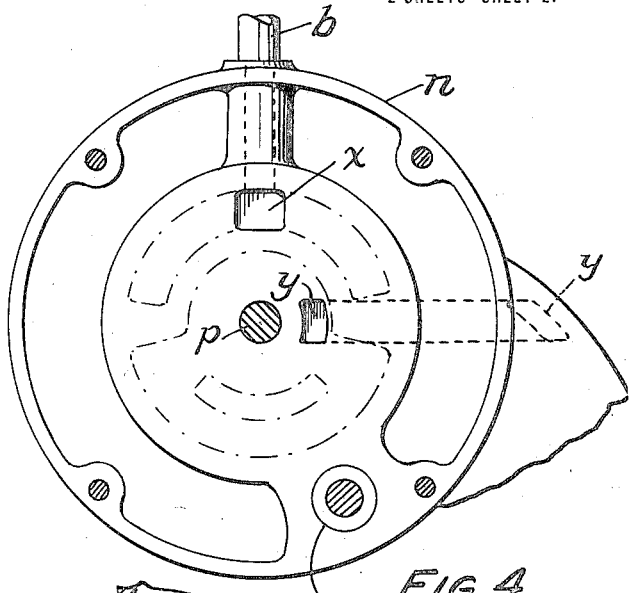
Fig. 4 is a face view of the valve seat with valve and cover removed.
Figure 5:
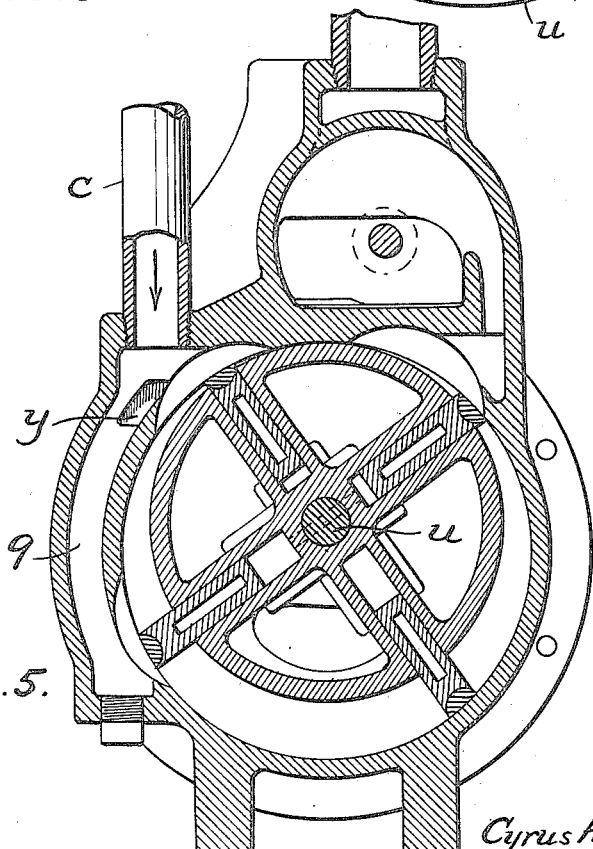
Fig. 5 is a vertical sectional view through the vacuum pump.

In the valve seat member or pump head, $n$, are two passages. One passage $x$ is connected to the pulsation pipe line $b$. The other passage $y$ extends through the pump head and communicates with the vacuum chamber 9 of the pump, which vacuum chamber is connected with the vacuum pipe line $c$ as shown in Fig. 5. The passages $x$ and $y$ open on the valve seat at different distances from the axis of rotation of the valve $o$.

The valve is provided, on its working face, with an arcuate (preferably circular) groove 10 adapted to register (preferably continuously) with the vacuum passage $y$; and with an arcuate groove 11 and an arcuate groove 12, both cut on the same radius and adapted, in the rotation of the valve, to register alternately with the pulsation passage $x$. One or more radial passages 13 connect the passages 10 and 11. One or more ports 14 connect the passage 12 with the exterior of the valve and hence with the atmosphere.

From the foregoing description it will be understood that the passages 11 and 12 are in communication with vacuum and atmosphere respectively, so that, in the rotation of the valve, the pulsation passage x and the pulsation pipe line b are connected alternately with vacuum and atmosphere, air being thus alternately exhausted from, and admitted to, the pulsation pipe line and pneumatic pulsations thus transmitted to the secondary pulsator in the chamber k of the claw.

It will be seen that the exterior of the valve is constantly exposed to atmospheric pressure, whereas the pressure operative against the working face of the valve is always a lower pressure. Thus, while the passage 12 is constantly exposed to pressure, the passages 10 and 11 are constantly exposed to vacuum. Hence there is no pressure tending at any time to lift the valve from its seat, but a constant pressure tending to hold the valve against its seat; so that special mechanical provisions to hold the valve to its seat are not really necessary. I have, however, applied to the cover v a projection z which limits the extent to which the valve may recede from its seat when the system is not operating.

It will be understood that where, in the claims, I refer to a source of vacuum and a source of pressure, I use these terms in a relative sense and not in an absolute sense. While I prefer to utilize a partial vacuum and ordinary atmospheric pressure, my invention contemplates the use of any differential absolute pressures, as, for example, vacuums of different degrees, pressure above that of the atmosphere and atmospheric pressure, and pressure above atmospheric and partial vacuum.

Having now fully described my invention, what I claim and desire to protect by Letters Patent is:—

1. In a milking machine, the combination with a milking machine unit comprising teat cups and a secondary pneumatic pulsator adapted to transmit pulsations to the teat cups, a pulsation air pipe line, a primary pneumatic pulsator adapted to transmit pulsations through said air pipe line and thereby control the operation of the secondary pulsator, a source of vacuum, a valve seat provided with a port connected with the pulsation pipe line and opening on the valve seat, a rotary valve turnable on the valve seat and provided with a plurality of ports adapted, in the rotation of the valve, to register successively with the first named ports, and means affording communication between said valve passages and the source of vacuum and a source of pressure respectively, two at least of said ports being each of substantial length so as to maintain the pulsation pipe line in communication with both pressure and vacuum for substantial time intervals.

2. In a milking machine, the combination with a source of vacuum and a pulsation pipe line, of a valve seat member provided with passages connected respectively with the pulsation pipe line and with the source of vacuum, a rotary valve turnable on the valve seat, said passages having ports opening on the valve seat at different distances from the axis of the valve; the valve having an arcuate passage adapted to register with the vacuum port in the valve seat, and a plurality of arcuate passages adapted to register successively with the pulsation port in the valve seat, one of the last named arcuate passages being connected with the first named arcuate passage, and the third arcuate passage being connected with a source of pressure, whereby in the rotation of the valve the pulsation pipe line will be connected alternately with pressure and vacuum.

3. In a milking machine, the combination with a source of vacuum and a pulsation pipe line, of a valve seat member provided with passages connected respectviely with the pulsation pipe line and with the source of vacuum, a rotary valve turnable on the valve seat, the valve having a plurality of passages adapted, in the rotation of the valve, to register successively with the pulsation port, there being a third passage in the valve affording communication between one of the first named two passages in the valve and the vacuum port in the valve seat member, the valve having a port connecting the other of the first named two passages in the valve with a source of pressure acting against the exterior of the valve, whereby the absolute pressure on the exterior of the valve tending to hold it on its seat continuously exceeds the absolute pressure to which the working face of the valve is exposed.

4. A master pulsator for a milking system having a pulsation pipe line and a suction pipe line, comprising a pump connected to the suction pipe line, a valve, driving means connecting the pump and valve for continuously rotating the valve, a flat valve seat for the valve, a port through the seat communicating with the pulsation pipe line, a second port through the valve seat communicating with the pump, arcuate passages of substantial length in the inner face of the valve arranged to successively register with the first port, one of said passages being open to atmosphere when in register with said port, the other passage being in register with the second port when in register with the first port.

In testimony of which invention, I have hereunto set my hand, at New York, on this 28th day of March, 1921.

CYRUS HOWARD HAPGOOD.